United States Patent
Seliskar et al.

(10) Patent No.: US 11,987,706 B2
(45) Date of Patent: May 21, 2024

(54) ELASTOMER COMPOSITION

(71) Applicant: Dow Global Technologies LLC, Midland, MI (US)

(72) Inventors: James T. Seliskar, Bay City, MI (US); Ted Hays, Richfield, OH (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 600 days.

(21) Appl. No.: 17/259,638

(22) PCT Filed: May 29, 2019

(86) PCT No.: PCT/US2019/034314
§ 371 (c)(1),
(2) Date: Jan. 12, 2021

(87) PCT Pub. No.: WO2020/027903
PCT Pub. Date: Feb. 6, 2020

(65) Prior Publication Data
US 2021/0317314 A1    Oct. 14, 2021

Related U.S. Application Data

(60) Provisional application No. 62/711,699, filed on Jul. 30, 2018.

(51) Int. Cl.
*C08L 91/00* (2006.01)
*B60N 3/04* (2006.01)

(52) U.S. Cl.
CPC ............... *C08L 91/00* (2013.01); *B60N 3/04* (2013.01); *C08L 2205/035* (2013.01)

(58) Field of Classification Search
CPC ...... C08L 91/00; C08L 2205/035; B60N 3/04
USPC ......................................................... 524/426
See application file for complete search history.

(56) References Cited

U.S. PATENT DOCUMENTS

| | | | |
|---|---|---|---|
| 2002/0111412 A1* | 8/2002 | Hartnett | C08L 9/06 524/437 |
| 2004/0220295 A1 | 11/2004 | Timcik et al. | |
| 2008/0161485 A1 | 7/2008 | Suzuki et al. | |
| 2016/0289437 A1 | 10/2016 | Kumagai et al. | |
| 2017/0051137 A1* | 2/2017 | Dussich | C08J 3/226 |
| 2020/0239689 A1 | 7/2020 | Seliskar et al. | |

FOREIGN PATENT DOCUMENTS

WO    2019045833 A1    3/2019

OTHER PUBLICATIONS

Office Action from corresponding Chinese 201980049711.9 application, dated Mar. 24, 2022.
PCT/US2019/034314, International Search Report and Written Opinion dated Sep. 9, 2019.

* cited by examiner

*Primary Examiner* — Hui H Chin
(74) *Attorney, Agent, or Firm* — Arthur R. Rogers

(57) ABSTRACT

An elastomer composition including (a) an elastomer blend component; (b) at least one first odor-reducing component; and (c) at least one second odor-reducing component; the elastomer component (a) including a hydrogenated block copolymer, a propylene polymer, a maleic anhydride grafted polymer, a mineral oil, and a filler, and/or a nucleating agent. The elastomer composition can be particularly suitable for fabricating injection molded non-carpet vehicle flooring with a reduced amount of undesirable odor.

14 Claims, No Drawings

ELASTOMER COMPOSITION

REFERENCE TO RELATED APPLICATIONS

The present application claims the benefit of U.S. Provisional Application No. 62/711,699, filed on Jul. 30, 2018.

FIELD

The present invention relates to a polymer blend composition; and more particularly, the present invention relates to a thermoplastic polymer blend composition that can be used in non-carpeted flooring applications.

BACKGROUND

Heretofore, elastomer compositions have been developed which can be injection molded into non-carpeted flooring materials useful for the automotive industry. For example, U.S. provisional patent application entitled "THERMOPLASTIC POLYOLEFIN FOR NON-CARPETED FLOORING," filed Aug. 30, 2017, by Seliskar, J., et al, discloses thermoplastic polymer blend compositions suitable for injection molding and for manufacturing fabricated articles or products such as non-carpet flooring molded articles. The non-carpet flooring molded articles prepared from the known elastomer compositions described in the above patent application have desirable qualities, such as good to superior melt strength and processability, moldability, mar resistance, modulus, elasticity, and the like. However, the odor property of the known non-carpet flooring molded articles or products is one property that can still be improved.

It would be desirable in the automotive industry to provide a composition for non-carpeted flooring applications that is suitable for injection molding and that exhibits a desirable balance of mechanical properties and durability without no or low objectionable odor.

SUMMARY

The present invention is directed to an elastomer composition that is suitable for injection molding and that can provide a molded article or product that exhibits a desirable balance of mechanical properties and durability without no or low objectionable odor. The present invention includes the selection, dosages, and synergistic combination of various functional additives that forms an elastomer composition useful for non-carpeted flooring applications.

The present invention elastomer compositions can be useful for non-carpeted flooring applications in the automotive industry and are suitable for injection molding. In addition, the present invention includes an elastomer composition that, when injection molded into an article or product, reduces the detectable odors in the injection-molding article or product at ambient temperature (e.g., when exposed to about 25 degrees celsius (° C.)) and at elevated temperatures (e.g., when exposed to about 80° C.).

In one general embodiment, the injection-moldable non-carpet flooring elastomer composition of the present invention includes (a) an elastomer blend component; (b) at least one first odor-reducing component; and (c) at least one second odor-reducing component.

Another embodiment of the present invention includes a process, such as an injection molding process, to make a vehicle non-carpet flooring using the above-described elastomer composition.

Still another embodiment of the present invention includes an article comprising the above-described elastomer composition, wherein the article is, for example, a vehicle non-carpet flooring.

DETAILED DESCRIPTION

The elastomer composition of the present invention includes an elastomer blend, as component (a), that comprises, consists essentially of, or consists of: (ai) a hydrogenated block copolymer having a number average molecular weight less than or equal to (≤)200,000 Daltons; (aii) a propylene homopolymer and/or a propylene copolymer comprising propylene as a principal component; (aiii) a mineral oil; (aiv) a maleic anhydride grafted polymer; and (av) a filler.

Component (ai) of the elastomer blend component can be a hydrogenated block copolymer. Suitable hydrogenated block copolymers can be obtained by hydrogenating a block copolymer which comprises at least one polymer block composed principally of a vinylic aromatic compound and at least one polymer block composed principally of a conjugated diene compound.

More specific examples of the aforesaid hydrogenated block copolymer include: (1) block copolymer of crystalline polyethylene and ethylene/butylene styrene random copolymer, said block copolymer being obtained by hydrogenating block copolymer of polybutadiene and butadiene-styrene random copolymer; and (2) block copolymer of polybutadiene and polystyrene, block copolymer of polyisoprene and polystyrene, diblock copolymer of crystalline polyethylene and polystyrene, said diblock copolymer being obtained by hydrogenating block copolymer of polybutadiene or ethylene-butadiene random copolymer and polystyrene, triblock copolymer of styrene-ethylene/butylene-styrene (SEBS), a triblock copolymer of styrene-ethylene-ethylene/propylene-styrene (SEEPS), and triblock copolymer of styrene-ethylene/propylene-styrene (SEPS), in particular, block copolymer of styrene-ethylene/butylene-styrene, and block copolymer of styrene-ethylene/propylene-styrene. Any one of the above-exemplified hydrogenated block copolymer may be used alone or in combination with at least one other hydrogenated block copolymer mentioned above. In one preferred embodiment, a styrene-ethylene/butylene-styrene (SEBS) is used. SEBS is a hydrogenated block copolymer having 67 percent (%) ethylene-butylene and 33% styrene copolymer. SEBS is available as CALPRENE™ H6170 from Dynasol.

In one preferred embodiment, the hydrogenated block copolymer has each a number-average molecular weight of at least 60,000 Daltons. In another preferred embodiment, the upper limit imposed on the number-average molecular weight thereof, can be ≤200,000 Daltons.

The content of non-crystalline styrene blocks in said hydrogenated block copolymer is generally in the range of from 10 weight percent (wt %) to 70 wt % in one embodiment and from 15 wt % to 60 wt % in another embodiment. The noncrystalline styrene blocks therein can have a glass transition temperature of from 60° C. or higher in one embodiment and from 80° C. or higher in another embodiment. In addition, noncrystalline styrene blocks are preferable as polymers for linking the noncrystalline styrene blocks at both the ends. Usually, the hydrogenated block copolymer can be used alone, but the hydrogenated block copolymer may also be used in combination with at least one other different hydrogenated block copolymer.

The hydrogenated block copolymer, component (ai), can be present in the elastomer composition in an amount of equal to or greater than (≥) 10 wt % in one embodiment, ≥12 wt % in another embodiment, and ≥14 wt % in still another embodiment, based on the total weight of the elastomer composition. The hydrogenated block copolymer (ai) can be present in the elastomer composition in an amount of ≤30 wt % in one embodiment, ≤28 wt % in another embodiment, and ≤26 wt % in still another embodiment, based on the total weight of the elastomer composition.

Component (aii) of the elastomer blend component can be a propylene homopolymer and/or propylene copolymer comprising propylene as a principal component. The propylene polymer comprising propylene as a principal component is exemplified by the copolymer of propylene and a small amount of an alpha-olefin such as propylene/ethylene copolymer and propylene/4-methyl-1-pentene copolymer.

The polypropylene polymer in the elastomer blend component (a) may be produced through polymerization by using a metallocene catalyst, for instance, a metal complex of a compound containing cyclopentadienyl ring, and has an extremely narrow molecular weight distribution as compared with conventional polypropylene, whereby a volatile low molecular component is hardly contained.

Alternatively, the propylene polymer used in the elastomer blend component (a) may be a conventional propylene polymer exemplified by isotactic polypropylene and atactic polypropylene, for instance, polypropylene which is obtained by polymerizing propylene in the presence of, for instance, Ziegler catalyst (titanium base). A random copolymer among the aforesaid copolymers can be obtained in the presence of a small amount of ethylene or another alpha-olefin at the time of polymerization, while block copolymer can be obtained by producing propylene homopolymer, and thereafter polymerizing ethylene in many cases.

No specific restriction is imposed upon the propylene polymer, however, Mw/Mn (Mw: weight-average molecular weight/Mn: number-average molecular weight) is usually in the range of 1.5 to 3.5. Generally, the propylene homopolymer and/or propylene copolymer can have a melt flow rate (MFR at 230° C. and 2.16 kg) in the range of 0.1 grams/10 minutes (g/10 min) to 100 g/10 min in one embodiment, a MFR of ≥5 g/10 min in another embodiment, and ≥10 g/10 min in still another embodiment. In another general embodiment, the MFR of the propylene polymer can be ≤50 g/10 min, and ≤25 g/10 min in still another embodiment. In one preferred embodiment, a propylene homopolymer having a MFR of 20 g/10 min, available from Entec, can be used.

The propylene homopolymer or propylene copolymer (aii) can be present in the elastomer-blend in an amount of ≥than 5 wt % in one embodiment, ≥6 wt % in another embodiment, and ≥7 wt % in still another embodiment, based on the total weight of the elastomer composition. The propylene homopolymer or propylene copolymer (aii) can be present in the elastomer blend in an amount of ≤30 wt % in one embodiment, ≤25 wt % in another embodiment, and ≤20 wt % in still another embodiment, based on the total weight of the elastomer composition.

Component (aiii) of the elastomer blend component (a) can be a mineral oil. The mineral oil assists in elastomer flow to fill the mold and give good surface appearance. The mineral oil also helps hardness adjustment; and therefore, also provides tactile feel and flexibility, which are properties that are important to non-carpet flooring applications.

Appropriate mineral oils for inclusion in the elastomer blend may include, for example, paraffinic hydrocarbons such as PRIMOL™ 352, a purified mixture of liquid saturated hydrocarbons that is commercially available from Exxon Mobil; a paraffinic oil, 600 SUS, with a kinematic viscosity at 40° C. of 107 centistokes (cSt) to 120 cSt available as MOTIVA STAR™ 12 from Motiva Enterprises, LLC; Citgo DUOPRIME™ Oil 350 available from Citgo Petroleum Corporation; CONOPURE™ 12P; or a high purity mineral oil such as SONNEBORN SEMTOL™ 500; and HYDROBRITE™ 550 PO OIL. In one preferred embodiment, a mineral oil can be used in the present invention; and in another preferred embodiment, a high viscosity mineral oil can be used in the present invention because such oils can provide the desired color and odor characteristics.

The mineral oil, component (aiii), can be present in the elastomer blend in an amount of ≥than 20 wt % in one embodiment, ≥25 wt % in another embodiment, and ≥30 wt % in still another embodiment, based on the total weight of the elastomer composition. The mineral oil can be present in the elastomer blend in an amount of ≤40 wt % in one embodiment, ≤37 wt % in another embodiment, and ≤34 wt % in still another embodiment, based on the total weight of the elastomer composition.

Component (aiv) of the elastomer blend component (a) can be a maleic anhydride grafted polymer (MAH-g-polymer). Exemplary of the polymers that can be grafted are polyolefins, such as ethylene homopolymers and/or copolymers, such as low density polyethylene (LDPE), linear low density polyethylene (LLDPE), high density polyethylene (HDPE), linear ethylene polymers (LEP), substantially linear ethylene polymers (SLEP), polypropylene homopolymer and/or propylene copolymers; rubbers; block copolymers; or hydrogenated block copolymers such as the ones disclosed herein above, especially SEBS.

Other useful MAH-g-polymers may include, for example, MAH-g-SESB a maleic anhydride grafted SESB available as SCONA™ TSKD 9103 from BYK Additives and Instruments; MAH-g-HDPE a maleic anhydride grafted HDPE available as AMPLIFY™ GR 204 from The Dow Chemical Company; and MAH-g-polypropylene (PP) a maleic anhydride grafted PP available as PRIEX™ 20093 from BYK Additives and Instruments.

The MAH-g-polymer, component (aiv), can be present in the elastomer blend in an amount of ≥0.5 wt % in one embodiment, ≥0.75 wt % in another embodiment, and ≥1.0 wt % in still another embodiment, based on the total weight of the elastomer composition. The MAH-g-polymer can be present in the elastomer composition in an amount of ≤10 wt % in one embodiment, ≤9 wt % in another embodiment, and ≤8 wt % in still another embodiment, based on the total weight of the elastomer composition.

A filler material, as component (av), can be included in the elastomer blend component (a). Appropriate fillers useful in the elastomer composition can include, for example, metal carbonates such as calcium carbonate; clay; talc; silica; carbon black; wollastonite; glass; metal sulfates such as calcium sulfate; mica; graphite fibers; other synthetic or natural fibers; and mixtures thereof. Other similar fillers known in the art or to be developed would also be appropriate for inclusion in the elastomer compositions. In one preferred embodiment, the fillers useful in the elastomer composition can have a particle size of from 0.5 micron (μ) to 20μ in one embodiment; and a particle size of from 1μ to 10μ in another embodiment.

In one embodiment, the filler used in the elastomer composition does not have to be surface treated. In another embodiment, the filler used in the elastomer composition can be colorless, in other words, the filler can be white.

Other useful fillers may include, for example, calcium carbonate ($CaCO_3$) such as $CaCO_3$-1, a surface treated calcium carbonate with an average particle size of 3.2 micron available as HUBERCARB™ G35T from Huber Engineered Materials; $CaCO_3$-2, a non-surface treated, white calcium carbonate having an average particle size of 3 microns available as KC 3 from Kish Company; $CaCO_3$-3, a non-surface treated, white calcium carbonate having an average particle size of 12 microns available as KW 325 from Kish Company; and $CaCO_3$-4, a non-surface treated, dark colored calcium carbonate having an average particle size of 12 microns available as KC 325 from Kish Company; and mixtures thereof.

The filler, component (av), can be present in the elastomer composition in an amount of ≥5 wt % in one embodiment, ≥10 wt % in another embodiment, ≥20 wt % in still another embodiment, ≥25 wt % in yet another embodiment, and ≥40 wt % in even still another embodiment, based on the total weight of the elastomer composition. In another embodiment, the filler concentration in the elastomer composition can be from 5 wt % to 50 wt %. In still other embodiments, the filler can be present in the elastomer composition in an amount ≤45 wt %, ≤43 wt %, or ≤40 wt %, based on the total weight of the elastomer composition.

The odor-reducing material, component (b), includes an elastomer composition that comprises, consists essentially of, or consists of: (bi) an odor-reducing material such as both blends of plant oils and plant based diluents. A specific example of component (b) is ECOSORB 206A. ECOSORB odor-reducing products that are proprietary blends of essential oils, surfactants, and water; and ECOSORB odor-reducing products are available from OMI Industries.

The odor-reducing material, component (b), can be present in the elastomer composition in a range of from 0.01 wt % to 2.0 wt % in one embodiment, from 0.1 wt % to 1.0 wt % in another embodiment, and from 0.1 wt % to 0.5 wt % in still another embodiment, based on the total weight of the elastomer composition.

Component (c) present in the elastomer composition of the present invention can be a silicone compound such as a siloxane compound, including for example, a polydimethylsiloxane (PDMS); a hydroxyl-functional polydimethylsiloxane; a silanol functional polydimethylsiloxane; vinyl functional silicone; or mixtures of these functional silicones and/or other functional silicones thereof. In one preferred embodiment, the siloxane elastomer compound can be PDMS such as a tri-methyl terminated PDMS.

Generally, the siloxane compound can have a viscosity of up to 15,000,000 cSt in one embodiment, from 50 cSt to 1,000,000 cSt in another embodiment, and from 100 cSt to 50,000 cSt in still another embodiment.

The siloxane compound, component (avi), can be present in the elastomer composition in an amount up to 2.0 wt % in one embodiment, and can be present in a range from 0.01 wt % to 2.0 wt % in one embodiment, from 0.1 wt % to 1.0 wt % in another embodiment, and from 0.1 wt % to 0.5 wt % in still another embodiment, based on the total weight of the elastomer composition.

It is theorized that the siloxane reduces shear during the processing lowering the amount of low molecular weight oligomers created in the process and therefor reducing smell.

In addition, the elastomer blend component (a) advantageously may further comprise at least one or more optional additives of the type conventionally added to elastomeric polymer compositions. The optional additives, if used, can be introduced into: (1) the elastomer composition by mixing the additives into the elastomer blend component (a), (2) the first odor-reducing compound component (b), (3) the second odor-reducing compound component (c), or (4) any of the components (a), (b) and/or (c). The order of mixing is not critical.

In one embodiment, the optional additive useful in the elastomer composition may include a nucleating agent. The nucleating agent can be a concentrate that uses polypropylene as the carrier and the nucleating agent as the active ingredient. For example, the nucleating agent concentrate is available as HYPERFORM™ Concentrate HI5-5 from Milliken. Other nucleating agents useful in the composition may include for example a benzoate salt or a phosphate ester salt or other salts.

In another embodiment, the optional additive may include, for example, antioxidants such as hindered phenolic antioxidants including IRGANOX™ 1010 antioxidant and IRGANOX 1076 antioxidant, available from Ciba-Geigy Corporation; or antioxidants such as organophosphates including IRGAFOS™ 168, also available from Ciba-Geigy Corporation. In another embodiment, the antioxidant can be a compound available as IRGANOX™ B225 available from BASF. Other antioxidants useful in the composition may include for example phenolics, secondary amines, phosphites and thioesters.

Other optional additives useful in the elastomer composition of the present invention may include for example surface tension modifiers; ultraviolet light stabilizers; ultraviolet light stabilizers used as a hindered amine, o-hydroxyphenylbenzotriazole, 2-hydroxy, 4-alkoxyenzophenone, salicylate, cyanoacrylate, a nickel chelate and a benzylidene malonate and oxalanilide; scratch/mar additives; anti-block agents; dispersants; blowing agents; linear or substantially linear ethylene polymers; LDPE; LLDPE; lubricants such as fatty acids, fatty alcohols, esters, fatty amides, metallic stearates, paraffinic and microcrystalline waxes, silicones; organosilicones; silanes; and orthophosphoric acid esters; crosslinking agents such as peroxides; antimicrobial agents such as organometallics, isothiazolones, organosulfurs and mercaptans; antistatic agents such as quaternary ammonium compounds, amines, and ethoxylated, propoxylated or glycerol compounds; hydrolytic stabilizers; mold release agents, such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, octyl ester of thioglycolic acid, and barium or cadmium carboxylate; zeolites; molecular sieves; other deodorizers; or mixtures of two or more of the above optional additives.

Any suitable combination of the above optional additives and additive amounts, as well as the method of incorporating the optional additive(s) into the composition can be carried out. In general, each of the above optional additives, if used, does not exceed 10 wt %, based on total composition weight; and can be advantageously used in the range of generally from 0 wt % to 10 wt % in one embodiment, from 0.001 wt % to 10 wt % in another embodiment, from 0.01 wt % to 5 wt % in still another embodiment, from 0.1 wt % to 10 wt % in yet another embodiment, and from 0.1 wt % to 1 wt % in even still another embodiment.

In producing the elastomer composition, the components of the elastomer blend component (a), the first odor-reducing component (b), and the second odor-reducing component (c)

may be mixed or blended by any known method. To obtain a homogeneous elastomer composition, the above-mentioned components may be dry blended, prior to compounding using a mixer, such as a Henschel mixer, a tumbler, a ribbon blender, shaken in a bag, or the like. Compounding, or melt blending, may take place in an extruder, a calenderer, a blow molding machine, foaming equipment, or other kind of forming equipment that melt mixes and makes a fabricated article; this is sometimes referred to as in-line compounding. Alternatively, the elastomeric polymer composition of the present invention may be melt blended by using a conventional kneader, such as a mixing roll, a kneader, a Banbury mixer, an extruder, or the like. In a conventional extrusion process, the elastomer composition can be obtained, generally, in the form of a pellet. The resulting pellet may then be extruded into a sheet, profile, blow molded article, injection molded article, or thermoformed. Additives may be added to the compounding process neat, in other words, in the additive's standard state (i.e., as a liquid and/or a powder); as a concentrate, and/or as a master batch.

In one embodiment, the above process can be used to make a non-carpet vehicle flooring comprising the elastomer composition described herein above, such as a truck non-carpeted flooring or an automotive non-carpeted flooring.

In another embodiment, the vehicle non-carpet flooring comprising the elastomer composition described herein above is made by injection molding.

EXAMPLES

The following examples are presented to further illustrate the present invention in detail but are not to be construed as limiting the scope of the claims. Unless otherwise stated all parts and percentages are by weight.

Various materials (ingredients or components) used in the Comparative Examples (Comp. Ex.) and the Inventive Examples (Inv. Ex.) which follow are described herein below in Table I.

TABLE I

| Ingredients | | |
|---|---|---|
| INGREDIENT | DESCRIPTION | SUPPLIER |
| IRGANOX B225 | Stabilizer (antioxidant) | BASF |
| PPH 020 | Polypropylene homopolymer having a 20 MFR. "MFR" stands for melt flow rate; and is determined according to ISO 1133 at 230° C. and 2.16 kg. | Entec |
| Motive Star 12 | Mineral oil; a paraffinic oil; 600 SUS; kinematic viscosity @ 40° C. is 107-120 cSt (1 cSt = 1 mm^2/sec); "SUS" stands for Saybolt universal second. | Motiva Enterprises, LLC |
| CALPRENE H6170 | SEBS; 67/33 ethylene-butylene/styrene copolymer; "SEBS" stands for styrene-ethylene/butylene-styrene which is a hydrogenated block copolymer. | Dynasol |
| KC 3 (white) | Calcium carbonate; particle size of 3 microns; untreated | Kish Company |
| Semtol 500 | Mineral oil; a paraffinic oil; 600 SUS; kinematic viscosity @ 40° C. is 107-120 cSt (1 cSt = 1 mm^2/sec) | Sonneborn/Polymer Holland |
| Hyperform HI5-5 | Nucleating agent | Milliken |

TABLE I-continued

| Ingredients | | |
|---|---|---|
| INGREDIENT | DESCRIPTION | SUPPLIER |
| PMX 200 Fluid | Odor reducer-Polydimethylsiloxane (PDMS). PDMS is a tri-methyl terminated PDMS, a siloxane elastomer compound having a viscosity of ~60,000 cSt | The Dow Chemical Company (Dow) |
| Priex 20093 | Maleic anhydride modified polypropylene | BYK Additives and Instruments |
| ECOSORB 206A[1] | Odor reducer | OMI Industries |
| ECOSORB 806A[1] | Odor reducer | OMI Industries |

[1]ECOSORB products are proprietary blends of essential oils, surfactants, and water, and are available from OMI Industries.

In addition to the ingredients described in Table I above, a pigment concentrate additive comprising a blend of inorganic pigment fillers; and a comparative elastomer composition product comprising a thermoplastic elastomer (TPE) composition based on styrenic block copolymer, oil, polypropylene, and calcium carbonate herein "Comparative Product A" were also used in some of the following Examples.

Examples 1 and 2 and Comparative Examples A-H

General Procedure for Preparing Compositions and Extruded Product

The compositions designated Comparative Examples (Comp. Ex.) and Inventive Examples (Inv. Ex.) and described in the Tables II and III used in the examples were prepared as described below. The amounts of the ingredients in the compositions described in Tables II and III are in weight percent based on the total weight of the elastomer composition.

The ingredients are pre-blended by first introducing the oil, SEBS and siloxane fluid into a small bag and the bag is shaken until the ingredients in the bag are evenly distributed, dry and free flowing. Next, the remaining ingredients are added to the bag and again the bag is shaken until the ingredients in the bag are evenly distributed, dry and free flowing. Next, the resulting blend of ingredients is placed into the hopper feeder that feeds the blended material into the throat of a Prism twin-screw extruder having a 40:1 L/D, co-rotating, and intermeshing screws. The extruder compounds and disperses the ingredients by heating the blended material to form a melted phase and mixing the ingredients in this melted phase. A temperature profile of the extruder, at its various zones, is used that produces a melt temperature of about 180° C. to 210° C. which includes a temperature profile of Zone 1 at 25° C., Zone 2 at 165° C., Zone 3 to Zone 5 at 190° C., Zones 6 and 7 at 185° C. and Zones 8 to 10 at 180° C. The temperature of the extruder die is at 180° C., and the extruder is operated at 250 revolutions per minute (RPM).

TABLE II

Compositions

| COMPONENT | Comparative Example A | Comparative Example B | Comparative Example C | Comparative Example D | Inventive Example 1 | Comparative Example E |
|---|---|---|---|---|---|---|
| COMPARATIVE PRODUCT A | 100.000% | — | 100.000% | — | — | — |
| IRGANOX B225 | — | 0.200% | — | 0.200% | 0.200% | 0.200% |
| PPH 020 | — | 7.425% | — | 7.425% | 7.425% | 7.425% |
| Motive Star 12 | — | 31.680% | — | 31.680% | — | — |
| CALPRENE H6170 | — | 20.988% | — | 20.988% | 20.988% | 20.988% |
| KC 3 (white) | — | 37.002% | — | 37.002% | 37.002% | 37.002% |
| Semtol 500 | — | — | — | — | 31.680% | 31.680% |
| Hyperform HI5-5 | — | 0.200% | — | 0.200% | 0.200% | 0.200% |
| PMX 200 Fluid | — | 1.000% | — | 1.000% | 1.000% | 1.000% |
| Priex 20093 | — | 1.485% | — | 1.485% | 1.485% | 1.485% |
| ECOSORB 206A | — | — | — | — | 0.020% | — |
| ECOSORB 806A | — | — | — | — | — | 0.020% |
| pigment concentrate | — | — | 2.000% | 2.000% | 2.000% | 2.000% |
| Total | 100.0% | 100.0% | 102.0% | 102.0% | 102.0% | 102.0% |

TABLE III

Compositions

| COMPONENT | Comparative Example F | Inventive Example 2 | Comparative Example G | Comparative Example H |
|---|---|---|---|---|
| COMPARATIVE PRODUCT A | 100.000% | — | — | — |
| IRGANOX B225 | — | 0.200% | 0.200% | 0.200% |
| PPH 020 | — | 7.425% | 7.425% | 7.425% |
| Motive Star 12 | — | — | — | — |
| CALPRENE H6170 | — | 20.988% | 20.988% | 20.988% |
| KC 3 (white) | — | 37.002% | 37.002% | 37.002% |
| Semtol 500 | — | 31.680% | 31.680% | 31.680% |
| Hyperform HI5-5 | — | 0.200% | 0.200% | 0.200% |
| PMX 200 Fluid | — | 1.000% | 0.500% | 0000% |
| Priex 20093 | — | 1.485% | 1.485% | 1.485% |
| ECOSORB 206A | — | 0.020% | 0.020% | 0.020% |
| ECOSORB 806A | — | — | — | — |
| pigment concentrate | 2.000% | 2.000% | 2.000% | 2.000% |
| Total | 102.0% | 102.0% | 101.5% | 101.0% |

General Odor Testing Procedure

The odor property for the resulting molded products prepared as described above from the compositions of Tables II and III is determined as follows:

"Odor" is determined by molding 4 plaques and placing the plaques directly into a sealed polyethylene bag immediately after molding. The bags are reopened 24 hours later and the odor emanating from the plagues is evaluated by smelling. A numerical rating of 1 to 5 is given to the odor evaluated with "1" being the most acceptable and "5" being the least acceptable. The results of the odor testing are described in Tables IV and V.

TABLE IV

Test Results

| Property | Testing Methods/Units | Comp. Ex. A | Comp. Ex. B | Comp. Ex. C | Comp. Ex. D | Inv. Ex. 1 | Comp. Ex. E |
|---|---|---|---|---|---|---|---|
| # detected odors | HS-GC-MS Analysis | 15 | 20 | 20 | 21 | 10 | 14 |
| # detected strong odors | HS-GC-MS Analysis | 0 | 3 | 2 | 3 | 0 | 0 |
| # detected med odors | HS-GC-MS Analysis | 4 | 10 | 9 | 11 | 2 | 2 |
| # detected weak odors | HS-GC-MS Analysis | 11 | 7 | 9 | 7 | 8 | 12 |

TABLE V

| Property | Testing Methods/Units | Comp. Ex. F | Inv. Ex. 2 | Comp. Ex. G | Comp. Ex. H |
|---|---|---|---|---|---|
| # detected odors | HS-GC-MS Analysis | 13 | 10 | 15 | 19 |
| # detected strong odors | HS-GC-MS Analysis | 0 | 0 | 1 | 1 |
| # detected med odors | HS-GC-MS Analysis | 6 | 3 | 5 | 8 |
| # detected weak odors | HS-GC-MS Analysis | 7 | 7 | 9 | 10 |

Inv. Ex. 2 described in Table III is a replicate of Inv. Ex. 1 described in Table II. The data in Tables IV and V shows the importance and the impact of using silicone oil, a second odor-reducing compound.

Comp. Ex. H shows that when ECOSORB additive, a first odor-reducing compound, is used without a second odor-reducing compound such as silicone oil, the composition does not work, i.e., the composition does not provide the desired reduction in odor.

Comp. Ex. D (described in Table II), shows that when a second odor-reducing compound such as silicone oil at 1 wt % is used without ECOSORB additive, a first odor-reducing compound, the composition does not work, i.e., the composition does not provide the desired reduction in odor.

Comp. Ex. G shows that when a second odor-reducing compound such as silicone oil at a reduced concentration of 0.5 wt % is used, even with ECOSORB additive, a first odor-reducing compound, the composition does not work, i.e., the composition does not provide the desired reduction in odor.

The above data, and in particular Inv. Ex. 1 and Inv. Ex. 2, shows that using a synergistic combination ECOSORB additive (a first odor-reducing compound) and silicone oil (a second odor-reducing compound) provides best in class odor.

What is claimed is:

1. An elastomer composition comprising:
   (a) an elastomer blend component comprising a mixture of:
      (ai) from 10 weight percent to 30 weight percent of a hydrogenated block copolymer produced by hydrogenating a block copolymer comprising at least one polymer block composed of a vinyl aromatic compound as a principal component and at least one polymer block composed of a conjugated diene compound as a principal component, said hydrogenated copolymer having a number average molecular weight ≤200,000 Daltons;
      (aii) from 5 weight percent to 30 weight percent of a propylene homopolymer and/or a propylene copolymer comprising propylene;
      (aiii) from 20 weight percent to 40 weight percent of a mineral oil;
      (aiv) from 0.5 weight percent to 10 weight percent of a maleic anhydride grafted polymer; and
      (av) from 10 weight percent to 45 weight percent of a non-surface treated filler;
   (b) at least one first odor-reducing component; and
   (c) at least one second odor-reducing component.

2. The composition of claim 1, wherein the first odor-reducing component (b) is selected from the group consisting of plant oils, plant-based diluents, and mixtures thereof.

3. The composition of claim 1, wherein the second odor-reducing component (c) is at least one silicone.

4. The composition of claim 3, wherein the at least one silicone is a tri-methyl terminated polydimethylsiloxane.

5. The composition of claim 1, wherein the concentration of the first odor-reducing component is from 0.01 weight percent to 2.0 weight percent; and wherein the concentration of the second odor-reducing component is from 0.01 weight percent to 2.0 weight percent, based on the total weight of the elastomer composition.

6. The composition of claim 1, wherein the hydrogenated block copolymer (ai) is styrene-ethylene/butylene-styrene.

7. The composition of claim 1, wherein the propylene homopolymer and/or a propylene copolymer comprising propylene is a propylene homopolymer with a melt flow rate equal to or less than 25 grams/10 minutes.

8. The composition of claim 1, wherein the maleic anhydride grafted polymer (aiv) is a maleic anhydride grafted SEBS block copolymer, a maleic anhydride grafted polyethylene, or a maleic anhydride grafted polypropylene.

9. The composition of claim 1, wherein the maleic anhydride grafted polymer (aiv) is a maleic anhydride styrene-ethylene/butylene-styrene block copolymer, a maleic anhydride grafted polypropylene, or a maleic anhydride grafted high density polyethylene.

10. The composition of claim 1, wherein the filler (av) is a non-surface treated, colorless calcium carbonate.

11. A process for making a molded product comprising the steps of:
   (A) forming an elastomer composition comprising:
      (a) an elastomer component including:
         (ai) from 10 weight percent to 30 weight percent of a hydrogenated block copolymer produced by hydrogenating a block copolymer comprising at least one polymer block composed of a vinyl aromatic compound as a principal component and at least one polymer block composed of a conjugated diene compound as a principal component, said hydrogenated copolymer having a number average molecular weight less than or equal to 200,000 Daltons;
         (aii) from 5 weight percent to 30 weight percent of a propylene homopolymer and/or a propylene copolymer comprising propylene as a principal component;
         (aiii) from 20 weight percent to 40 weight percent of a mineral oil;
         (aiv) from 0.5 weight percent to 10 weight percent of a maleic anhydride grafted polymer; and
         (av) from 10 weight percent to 45 weight percent of a non-surface treated filler;
      (b) from 0.01 weight percent to 2.0 weight percent of at least one first odor-reducing component; and
      (c) from 0.01 weight percent to 2.0 weight percent of at least one second odor-reducing component; and
   (B) injection molding the elastomer composition into a shaped molded product.

12. A shaped molded product article made by the process of claim 11.

13. The article of claim 12, wherein the article is a non-carpeted flooring.

14. A process for reducing the odor of an injection molded non-carpet flooring article comprising (I) adding at least a first oder-reducing compound and at least a second oder-reducing compound to an elastomer composition adapted for injection molding, the elastomer blend component comprising a mixture of:
   (ai) from 10 weight percent to 30 weight percent of a hydrogenated block copolymer produced by hydrogenating a block copolymer comprising at least one polymer block composed of a vinyl aromatic compound as a principal component and at least one polymer block composed of a conjugated diene compound as a principal component, said hydrogenated copolymer having a number average molecular weight≤200,000 Daltons;

(aii) from 5 weight percent to 30 weight percent of a propylene homopolymer and/or a propylene copolymer comprising propylene;

(aiii) from 20 weight percent to 40 weight percent of a mineral oil;

(aiv) from 0.5 weight percent to 10 weight percent of a maleic anhydride grafted polymer; and (av) from 10 weight percent to 45 weight percent of a non-surface treated filler; and (II) injection molding the elastomer composition into a shaped molded product.

\* \* \* \* \*